(No Model.) 2 Sheets—Sheet 1.

H. R. ALLEN.
CORN HARVESTING MACHINE.

No. 304,685. Patented Sept. 9, 1884.

WITNESSES:
Paul Hough
Samuel A. Minturn

INVENTOR:
Horace R. Allen.
per Minturn & Minturn
Attorneys.

(No Model.) 2 Sheets—Sheet 2.

H. R. ALLEN.
CORN HARVESTING MACHINE.

No. 304,685. Patented Sept. 9, 1884.

WITNESSES:
Paul Hough
Samuel A. Minturn

INVENTOR:
Horace R. Allen.
per Minturn & Minturn
Attorneys.

UNITED STATES PATENT OFFICE.

HORACE R. ALLEN, OF INDIANAPOLIS, INDIANA.

CORN-HARVESTING MACHINE.

SPECIFICATION forming part of Letters Patent No. 304,685, dated September 9, 1884.

Application filed May 24, 1883. (No model.)

*To all whom it may concern:*

Be it known that I, HORACE R. ALLEN, of Indianapolis, in the county of Marion and State of Indiana, have invented certain new and useful Improvements in Corn-Harvesting Machines; and I do hereby declare that the following is a full, clear, and exact description of the same.

My invention relates to improvements in corn-harvesters, the objects being to increase the capacity of such machines by using two sets of knives cutting two rows of corn at once; to provide means for conveying the cut stalks, standing upright, to a gathering device, where they are bound; to provide means for dropping the bundle or shock to the ground still in an upright position.

The invention consists in the two cutters and means for operating them, in the improved construction of the conveyers and of the gathering and releasing devices, and in details of construction, fully hereinafter explained.

Figure 1:
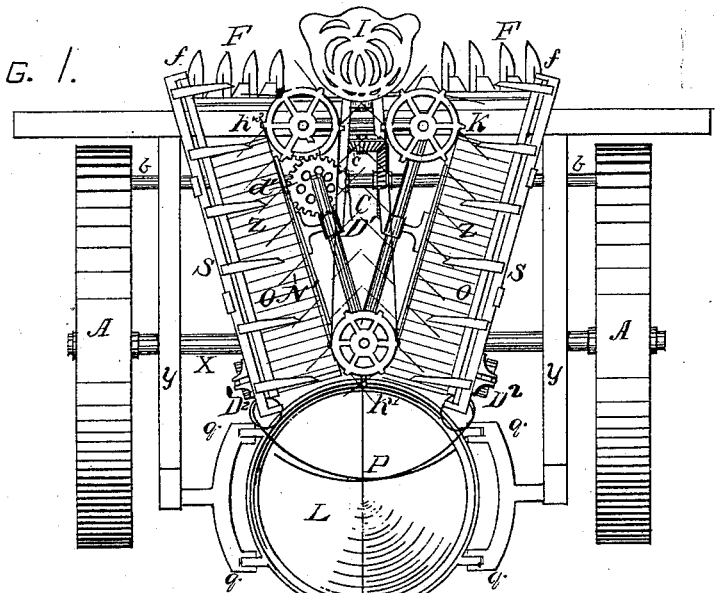
Figure 2:
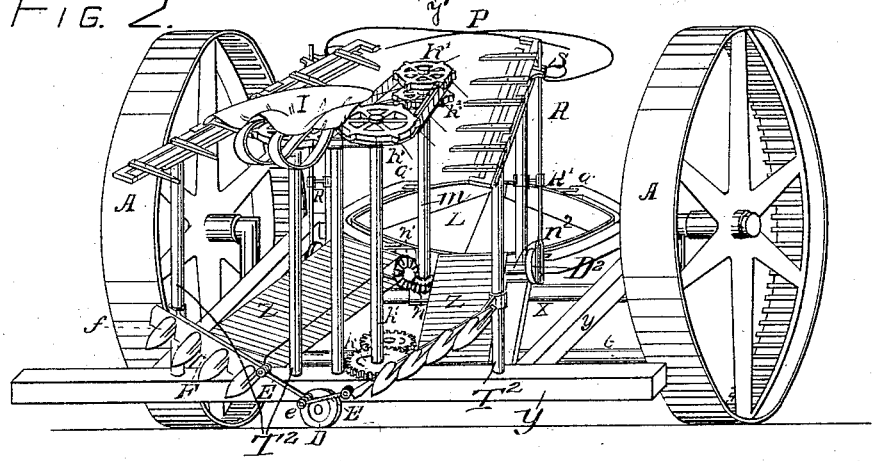
Figure 3:
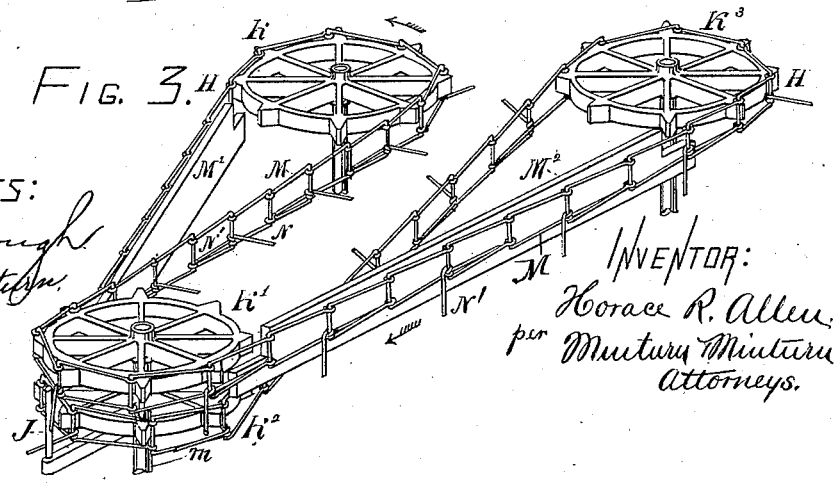
Figure 4:
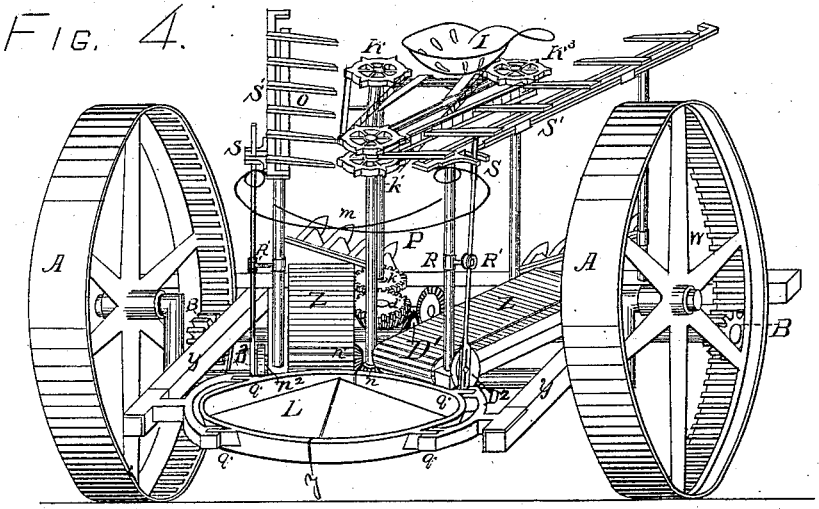
Figure 5:
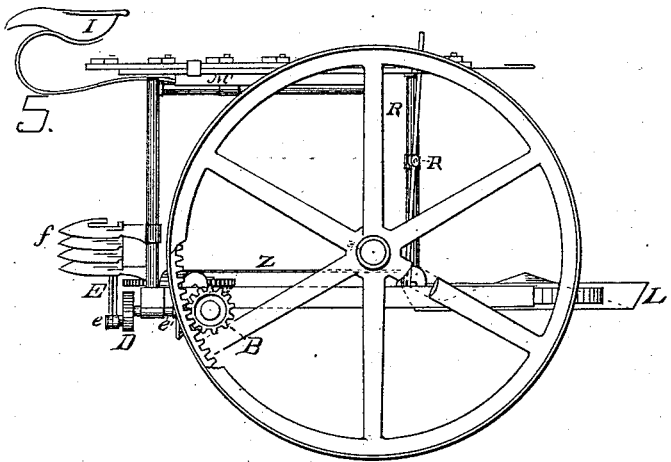
Figure 7:
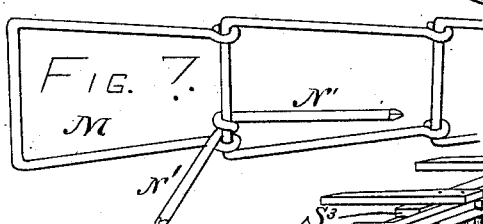
Figure 6:
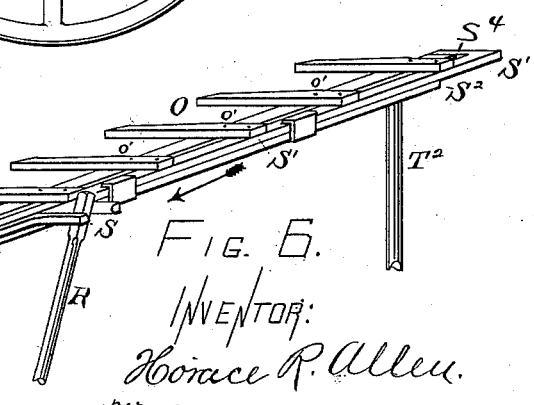

In the drawings accompanying this specification, Figure 1 is a plan view. Fig. 2 is a front perspective. Fig. 3 is an enlarged perspective of the chain conveyer. Fig. 4 is a rear perspective. Fig. 5 is a side elevation. Fig. 6 is an enlarged view of the auxiliary conveyer. Fig. 7 is a detail of a portion of the chain and one of the pivoted fingers.

Throughout the drawings, A A represent the driving and carrying wheels of a corn-harvester, which turn freely on the journals of a fixed axle, X, which is bent or cranked downward to give more space for the working parts of the machine, and to bring the carrying-frame $y$ as near the ground as practicable. The frame $y$ is of wood, and is composed of side bars and a front cross-bar, Fig. 2. In the side bars of the carrying-frame is journaled a transverse shaft, $b$, extending entirely across the machine, Fig. 4. On each end of this shaft is keyed a pinion, B, which meshes with an internal gear upon the inside of the rim of each driving-wheel. Keyed to this shaft $b$ near its middle is a bevel gear-wheel, C, which gives rotary motion to a short shaft, $e'$, Fig. 5, by means of a pinion, $c$. The shaft $e'$ is journaled in the front cross-bar of the main frame, and carries upon its outer end a disk, E, having a wrist-pin, $e$. Pitmen E' E' connect the crank-wheel to the cutter-bars F, placed one on each side at such an angle with the ground as to make a shearing cut. The finger-bars are provided with the usual guard-fingers. The sickles, in general, resemble those in general use in mowers and reapers, and their reciprocatory movement caused by the rotation of the crank-wheel E will be readily understood.

The apparatus for conveying the cut stalks to the rear of the machine, where they are discharged, will now be described.

On the transverse shaft $b$ is keyed a bevel-pinion, D', which meshes into a combined bevel and spur wheel, $d'$. (Clearly shown in Fig. 4.) With the spur portion of the periphery of this wheel meshes a gear-wheel, $k$, keyed upon a vertical shaft, $k'$, stepped in the main frame, and carrying on its upper end a sprocket-wheel, K. A vertical shaft, $m$, is stepped in a bearing in the axle, Fig. 2, and on its upper end are mounted a tight sprocket-wheel, $K^2$, and a loose sprocket-wheel, $K'$. Another sprocket-wheel, $K^3$, is mounted on a vertical shaft supported in the main frame. These wheels support the triangular chain conveyer, of which detail views are shown in Figs. 3 and 7. The conveyer is composed of wire links M, approximately rectangular. On one of the vertical bars of alternate links are barbs or fingers N', composed of a length of wire twisted loosely around the bar, so that such bar forms a pivot upon which the finger may turn. A continuous length of chain is mounted on the sprocket-wheels K K' K² K³, as shown in Fig. 3, the wheel K revolving with the arrow. The chain passes first to the tight wheel K², (giving motion to shaft $m$,) thence inward to the inner side of wheel K³, thence back to the loose wheel K', and again to wheel K. Acting in connection with this conveyer (the operation of which will be more fully described) are traveling aprons Z Z, to which the corn passes as it is cut. These aprons pass over any suitable kind of rollers in the front of the machine, but derive motion from the revolution of the shaft $m$ of the wheel K². On the lower end of shaft $m$ is a bevel-pinion, $n$, meshing with a pair of bevel-wheels, n', Figs. 2 and 4, carried on shafts n², which also support the rear rollers of the aprons Z. The movement of the aprons is thus at the same rate of speed as the chain conveyer—a little faster than that of the machine itself.

In the operation of the chain conveyer the corn on the aprons is supported by the fingers N', which pass in close proximity to the brace-boards M' M'. The outer portions of the chain move in the same direction, as shown by the arrows, while the brace-boards prevent the fingers from turning. Supposing that we are following the course of the chain as it leaves the wheel K, when the end of the brace-board is reached, each finger N', as it passes around wheel K², strikes a vertical pin, J, causing the finger to turn on the chain-link, throwing its other end outward, and releasing the stalks. The fingers thus turned are now in position to support the corn cut by the other sickle, which they meet at the point H, near the wheel K³. The operation is repeated on this side of the machine until the pin J again throws the fingers into their original position, ready to meet the corn cut by the first sickle.

In order to prevent the stalks from falling outward, and at the same time to push them forward, I have provided the additional conveying device shown in detail in Fig. 6. Upon the supports T² T², fixed in the main frame, is a flat beam, S², upon which slides a recessed bar, S', to which are pivoted inwardly-projecting arms O. Fitted to the recess in the bar S' is a shorter slide, S³, to which the arms O are also pivoted at o'.

Motion is imparted to this mechanism by a crank-wheel, D², keyed to each of the shafts n² n², before described. An oscillating lever, R, is connected by a long slat to the wrist-pin of crank-wheel D², and is pivoted on a pin, R', projecting from one of the supports T². The upper end of the lever R works in a slot in the slide-bar S'. The parts are shown in Fig. 7 at the time when the arms O have been moved backward — i. e., toward the rear—a full stroke, bringing a right-angled projection, S⁴, of slide S' in the rear of the bar S³. Now, on the next stroke the slide S' will begin to move forward, while slide S³ is stationary. This causes the arms O to swing on pivots o' to a position parallel to the slide. When the projection S⁴ strikes the end of slide S³, both slides move at the same time as one to the opposite end. At the next stroke the slide S' commences its backward movement independently, throwing out the arms at right angles and in operative position.

I prefer to use the device just described; but, if desired, a chain conveyer like that previously described may be used instead.

The corn, after leaving the conveyers, passes in an upright position to a conical platform, L, supported in the main frame, and having a raised rim. The platform is made in two sections, the line of division being at y', and these sections are hinged to the supporting-frame, as shown at q. The platform is made conical, to cause the standing stalks to spread outward against the rim, giving the shock a broad base. The stalks are gathered upon the platform by two wire springs, P P, placed above such platform. When a sufficient quantity of corn is upon the platform, a suitable catch is released, letting the half-sections fall and the shock drop to the ground. The sections are then closed, in readiness to receive another shock.

Having thus fully described my invention, what I claim as new, and desire to secure by Letters Patent, is—

1. In a corn-harvester adapted to cut two rows simultaneously, the combination of two cutters, a traveling apron on the rear of each cutter, a continuous conveyer operating in connection with both cutters and their respective aprons, and a gathering device, substantially as described.

2. In a corn-harvester, the combination of two cutters, a pair of traveling aprons and a conveyer consisting of an endless chain, arranged substantially as described, to convey the cut corn from both cutters simultaneously, and mechanism for operating such parts, substantially as described.

3. The combination of the cutting device, the belts or aprons, the chain conveyer, and the sliding conveyer having automatically-folding arms, constructed and arranged to operate substantially as described.

4. In a corn-harvester, a conveyer composed of a continuous chain, in combination with its carrying-pulleys and operating mechanism, all constructed and arranged to operate in such a manner that the outer sides of such chain move in the same direction—that is, toward the rear of the machine—substantially as described.

5. The combination of the shaft k', pulley K, shaft m, having tight and loose pulleys K² K', the pulley K³, the chain mounted on such pulleys, and mechanism for operating the said parts, substantially as described.

6. In a corn-harvester having two cutters, a conveyer consisting of an endless chain, the opposite sides of which are adapted to move toward the rear of the machine, in combination with pivoted reversible fingers and means for automatically reversing such fingers, for the purpose set forth.

7. In combination with the endless-chain conveyer, constructed substantially as described, fingers composed of two arms of equal length pivoted in the chain, and a pin, J, all substantially as and for the purposes set forth.

8. The combination, with the shaft k', means for driving it, substantially as described, the sprocket-wheels, the chain conveyer, and the shaft m, of the shafts n² n², the connecting-gearing, and the traveling aprons adapted to move at the same rate of speed as the chain, all substantially as set forth.

9. In a corn-harvester, the combination, with the cutters and the traveling aprons, of the sliding conveyers having the automatically-folding arms O, substantially as described.

10. In combination, the sliding bar S', the arms O, pivoted thereto, the shorter slide S³, also pivoted to the arms O, and the pivoted lever R, arranged to operate substantially as described.

11. In combination with the cutting and conveying devices of a corn-harvester, a conical gathering-platform having a raised rim, substantially as and for the purposes set forth.

HORACE R. ALLEN.

Witnesses:
VAN B. STIAWALT,
SILAS M. SHEPARD.